No. 643,526. Patented Feb. 13, 1900.
R. ORFORD.
SPRAY ATTACHMENT.
(Application filed Oct. 19, 1899.)
(No Model.)
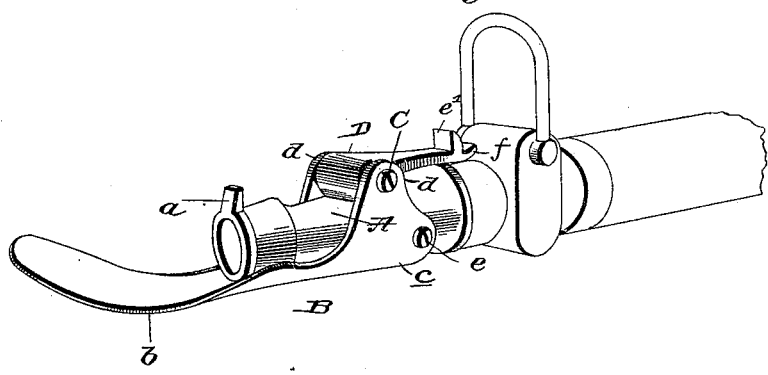
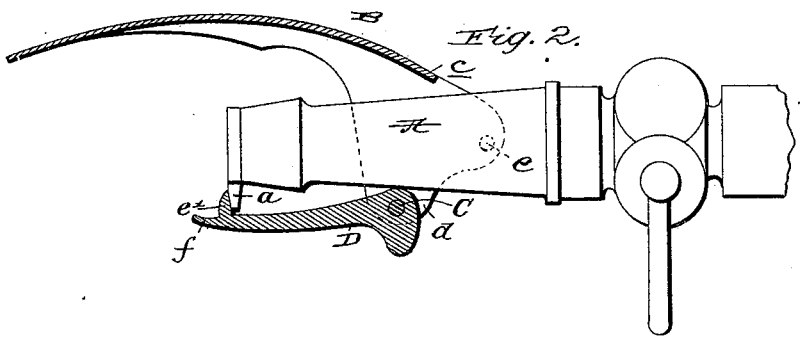
Witnesses:
C. H. Raeder
J. G. Croney
Inventor
Richard Orford.
By James J. Sheehy
Attorney

UNITED STATES PATENT OFFICE.

RICHARD ORFORD, OF ST. JOSEPH, MICHIGAN.

SPRAY ATTACHMENT.

SPECIFICATION forming part of Letters Patent No. 643,526, dated February 13, 1900.

Application filed October 19, 1899. Serial No. 734,099. (No model.)

*To all whom it may concern:*

Be it known that I, RICHARD ORFORD, a citizen of the United States, residing at St. Joseph, in the county of Berrien and State of Michigan, have invented new and useful Improvements in Spray Attachments, of which the following is a specification.

My invention relates to that class of hose-nozzles which are provided with a spray attachment and are designed more particularly for fire-extinguishing purposes. It has for its general object to improve the nozzle forming the subject-matter of my Letters Patent No. 624,240, of May 2, 1899, by providing means for securing the spray attachment in its inoperative as well as in its operative position, thus effectually preventing the said attachment when out of operation and disposed above or below the nozzle from interfering with the throwing of a solid stream.

With the foregoing in mind the invention will be fully understood from the following description and claims when taken in conjunction with the annexed drawings, in which—

Figure 1 is a perspective view of a nozzle provided with my improvements and showing the spray attachment in its operative position. Fig. 2 is a longitudinal section with parts in elevation, illustrating the spray attachment as secured in its idle position and the nozzle adapted to throw a solid stream.

Referring by letter to the said drawings, A is the nozzle, provided at its forward end with a lateral lug $a$, which is beveled on its forward side for a purpose presently described, and B is the spray attachment.

The spray attachment, like that disclosed in my aforesaid Letters Patent, is preferably formed in one piece of metal and comprises a broad upwardly and forwardly inclined forward portion $b$, which when the attachment is in its operative position is adapted to rest in advance of and in the same plane as the mouth of the nozzle, and a shank $c$ of concavo-convex form in cross-section which is designed to receive the nozzle, as shown in Fig. 2. The shank is provided adjacent to its rear end with ears $d$ and is pivotally connected by screws $e$ or other means to the nozzle at opposite sides thereof, and hence it follows that the attachment may assume the operative position shown in Fig. 1 or the idle position of Fig. 2, or when held as shown in Fig. 1 and released may gravitate to an idle position.

C is a transverse pintle secured in the ears $d$ above the nozzle, and D is an eccentric-lever which is mounted on the pintle and is designed, in the position shown in Fig. 1, to bear against the nozzle and lock or secure the spray attachment in its operative position and is also adapted when thrown over in its position to serve as a stop in limiting the movement of the forward portion of the spray attachment away from the nozzle.

The lever D may be quickly and conveniently manipulated, and hence it follows that when the spray attachment is in use and it is desired to throw a solid stream the attachment may be quickly released and moved into the position shown in Fig. 2, or if a solid stream is being thrown and it is desired to throw a spray the attachment may be readily raised and secured in its operative position.

When the nozzle is held with the spray attachment below it and the lever is thrown over forward, the attachment will, by reason of gravity, assume its idle position.

In order to secure the spray attachment in its idle position when it is disposed below the nozzle or above the same, as shown in Fig. 2, I provide the lever D at its forward end with the lateral projection $e$, which is designed to engage the lug $a$ of nozzle A after the manner shown in Fig. 2. When the projection $e'$ is thus placed in frictional engagement with the lug $a$, the spray attachment will be securely held against casual movement, and hence will be precluded from interfering with the nozzle throwing a solid stream. On the other hand, when it is desired to throw a spray the lever D may be readily disengaged from the lug $a$ and thrown back into the position shown in Fig. 1, in which position it is adapted to secure the spray attachment in its operative position.

It will be appreciated from the foregoing that my improvements for securing the spray attachment against casual movement from its inoperative position add materially to the efficiency of the nozzle and yet do not appreciably increase the cost thereof, the lug $a$ being preferably cast or otherwise formed integral with the nozzle A and the projection e being integral with the lever D.

I prefer in practice to extend the lever D a slight distance beyond the projection e', as shown, so as to form a lip f, which is designed to afford a finger-grasp and permit of the lever being readily disengaged from the lug of the nozzle, as desired. I do not desire, however, to be understood as confining myself to the employment of the lip, as the lever is complete without the same.

Having thus described my invention, what I claim is—

1. The combination of a nozzle having a lateral lug, a spray attachment pivotally connected to the nozzle, and an eccentric-lever connected to the spray attachment so as to engage the nozzle and having a lateral projection adapted to engage the lug of the nozzle, substantially as specified.

2. The combination of a nozzle having a lateral lug, a spray attachment pivotally connected to the nozzle and having ears disposed at opposite sides of the same, and an eccentric-lever arranged between and connected with the ears and adapted to bear against the nozzle, and having a lateral projection at its forward end adapted to engage the lug of the nozzle, substantially as specified.

In testimony whereof I have hereunto set my hand in presence of two subscribing witnesses.

RICHARD ORFORD.

Witnesses:
O. O. JORDAN,
M. H. STUART.